(12) United States Patent
Xiao et al.

(10) Patent No.: US 8,789,134 B2
(45) Date of Patent: Jul. 22, 2014

(54) METHOD FOR ESTABLISHING TRUSTED NETWORK CONNECT FRAMEWORK OF TRI-ELEMENT PEER AUTHENTICATION

(75) Inventors: Yuelei Xiao, Shaanxi (CN); Jun Cao, Shaanxi (CN); Li Ge, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 124 days.

(21) Appl. No.: 13/264,683

(22) PCT Filed: Dec. 9, 2009

(86) PCT No.: PCT/CN2009/075435
§ 371 (c)(1),
(2), (4) Date: Oct. 14, 2011

(87) PCT Pub. No.: WO2010/118610
PCT Pub. Date: Oct. 21, 2010

(65) Prior Publication Data
US 2012/0036553 A1    Feb. 9, 2012

(30) Foreign Application Priority Data

Apr. 16, 2009  (CN) .......................... 2009 1 0022058

(51) Int. Cl.
*H04L 29/06* (2006.01)
(52) U.S. Cl.
USPC .......................................................... 726/1
(58) Field of Classification Search
USPC .......................................................... 726/1
See application file for complete search history.

(56) References Cited

U.S. PATENT DOCUMENTS

| 6,199,113 B1 | 3/2001 | Alegre et al. |
| 7,592,906 B1 | 9/2009 | Hanna et al. |
| 7,793,096 B2 | 9/2010 | Hurst et al. |

(Continued)

FOREIGN PATENT DOCUMENTS

| CN | 1976337 A | 6/2007 |
| CN | 1976338 A | 6/2007 |

(Continued)

OTHER PUBLICATIONS

TCG Trusted Network Connect TNC Architecture for Interoperability, Specification Version 1.3, Revision 6, Apr. 28, 2008.*

(Continued)

*Primary Examiner* — Vu Le
*Assistant Examiner* — Tracy Mangialaschi
(74) *Attorney, Agent, or Firm* — Harness, Dickey & Pierce, P.L.C.

(57) ABSTRACT

The present invention provides a method for establishing the trusted network connect framework of tri-element peer authentication. The method includes: the implement of trusted network transport interface (IF-TNT); the implement of authentication policy service interface (IF-APS); the implement of trusted network connect (TNC) client-TNC access point interface (IF-TNCCAP); the implement of evaluation policy service interface (IF-EPS); the implement of integrity measurement collector interface (IF-IMC); the implement of integrity measurement verifier interface (IF-IMV); and the implement of integrity measurement (IF-IM). The embodiments of the present invention can establish the trust of the terminals, implement the trusted network connect of the terminals, implement the trusted authentication among the terminals, implement the trusted management of the terminals, and establish the TNC framework based on tri-element peer authentication (TePA) by defining the interfaces.

15 Claims, 4 Drawing Sheets

(56) References Cited

U.S. PATENT DOCUMENTS

| | | |
|---|---|---|
| 7,827,545 B2 | 11/2010 | Choe et al. |
| 7,827,593 B2 | 11/2010 | Smith et al. |
| 7,849,495 B1 | 12/2010 | Huang et al. |
| 7,982,595 B2 | 7/2011 | Hanna et al. |
| 8,191,113 B2 | 5/2012 | Xiao et al. |
| 8,255,977 B2 | 8/2012 | Xiao et al. |
| 8,336,083 B2 | 12/2012 | Xiao et al. |
| 8,424,060 B2 | 4/2013 | Xiao et al. |
| 8,495,712 B2 | 7/2013 | Lai et al. |
| 8,533,806 B2 | 9/2013 | Xiao et al. |
| 2005/0216736 A1 | 9/2005 | Smith |
| 2005/0223007 A1 | 10/2005 | Zimmer et al. |
| 2006/0015718 A1 | 1/2006 | Liu et al. |
| 2006/0248337 A1 | 11/2006 | Koodli |
| 2007/0136577 A1 | 6/2007 | Bade et al. |
| 2007/0143629 A1 | 6/2007 | Hardjono et al. |
| 2007/0198837 A1 | 8/2007 | Koodli et al. |
| 2007/0300069 A1 | 12/2007 | Rozas |
| 2008/0072329 A1 | 3/2008 | Herschaft |
| 2008/0182592 A1 | 7/2008 | Cha et al. |
| 2008/0276301 A1 | 11/2008 | Nataraj et al. |
| 2008/0288777 A1 | 11/2008 | Lai et al. |
| 2009/0077631 A1 | 3/2009 | Keohane et al. |
| 2010/0031031 A1 | 2/2010 | Tian et al. |
| 2010/0037302 A1 | 2/2010 | Lai et al. |
| 2010/0251334 A1 | 9/2010 | Xiao et al. |
| 2011/0145425 A1 | 6/2011 | Xiao et al. |
| 2011/0202992 A1 | 8/2011 | Xiao et al. |
| 2012/0047555 A1 | 2/2012 | Xiao et al. |
| 2012/0185694 A1 | 7/2012 | Munetoh et al. |

FOREIGN PATENT DOCUMENTS

| | | |
|---|---|---|
| CN | 101136928 A | 3/2008 |
| CN | 101159640 A | 4/2008 |
| CN | 101159660 A | 4/2008 |
| CN | 101242266 A | 8/2008 |
| CN | 101242268 A | 8/2008 |
| CN | 101247223 A | 8/2008 |
| CN | 101345660 A | 1/2009 |
| CN | 101394283 A | 3/2009 |
| CN | 101527717 A | 9/2009 |
| CN | 101527718 A | 9/2009 |
| CN | 101540676 A | 9/2009 |
| CN | 100566252 C | 12/2009 |
| CN | 101540676 B | 5/2012 |
| EP | 1182557 A2 | 2/2002 |
| WO | WO-2006117738 A1 | 11/2006 |

OTHER PUBLICATIONS

TCG Trusted Network Connect TNC IF-IMC, Specification Version 1.2, Revision 8, Feb. 5, 2007.*

Wang, Zhenyu, et al. "Design and Implementation of Wireless Trusted Access Protocol for Embedded Trusted Endpoints." Wireless Communications, Networking and Mobile Computing, 2008. WiCOM'08. 4th International Conference on. IEEE, 2008.*

TCG Trusted Network Connect. TNC Architecture for Interoperability. Specification Version 1.4, Revision 4. May 18, 2009.

International Search Report for PCT/CN2009/075435 (in English) mailed Mar. 18, 2010; ISA/CN.

Office Action regarding U.S. Appl. No. 12/628,903, dated Dec. 12, 2011.

TCG Trusted Network Connect TNC Architecture for Interoperability. Specification Version 1.1. Revision 2. May 1, 2006.

TCG Trusted Network Connect. TNC Architecture for Interoperability. Specification Version 1.2. Revision 4. May 21, 2007.

Trusted Network Connect—Open Standards for Integrity-based Network Access Control. 2005. Trusted Computing Group. p. 1-4.

International Search Report regarding Application No. PCT/CN2008/071699, mailed Nov. 6, 2008.

Ge Qin et al. "Research on Trusted Platform Module." Journal of Information Engineering University. vol. 7, No. 4. Dec. 2006.

TNC—Trusted Network Connection. Netinfo Security. China Academic Journal Electronic Publishing House. Mar. 2007. Abstract provided by Unitalen Attorneys at Law.

Office Action regarding U.S. Appl. No. 12/626,546, mailed Feb. 1, 2012.

European Search Report regarding Application No. 08773227.7, dated Nov. 4, 2011.

Japanese Office Action regarding Application No. 2010-518480, mailed Aug. 21, 2012. Translation provided by Unitalen Attorneys at Law.

Sachiko Yoshihama. "Platform Trust Based Access Control Framework." The 2006 Symposium on Cryptography and Information Security. Hiroshima, Japan. Jan. 17-20, 2006. The Institute of Electronica, Information and Communication Engineers. Translation provided by Unitalen Attorneys at Law.

Xiao-Yong Li et al. "An Efficient Attestation for Trustworthiness of Computing Platform." Proceedings of the 2006 International Conference on Intelligent Information Hiding and Multimedia Signal Processing. Dec. 2006.

"What is TCG's Trusted Network Connect?" Interop Labs. May 2007.

Shane Balfe et al. "Trusted Computing: Providing Security for Peer-to-Peer Networks." Information Security Group, Royal Holloway, University of London, United Kingdom. Proceedings of the Fifth IEEE International Conference on Peer-to-Peer Computing. Aug. 31-Sep. 2, 2005.

International Search Report regarding Application No. PCT/CN2009/075942, mailed Apr. 1, 2010.

U.S. Office Action regarding U.S. Appl. No. 13/266,856, mailed Sep. 6, 2013.

TCG Trusted Network Connect TNC IF-IMV. Specification Version 1.2, Revision 8. Feb. 5, 2007. p. 1-91.

* cited by examiner

METHOD FOR ESTABLISHING TRUSTED NETWORK CONNECT FRAMEWORK OF TRI-ELEMENT PEER AUTHENTICATION

CROSS-REFERENCE TO RELATED APPLICATIONS

This application is a U.S. National Phase application of PCT/CN2009/075435, filed Dec. 9, 2009, and published in the Chinese language as WO/2010/118610 on Oct. 21, 2010. This application claims priority to Chinese patent application No. 200910022058.5, filed with China's State Intellectual Property Office on Apr. 16, 2009. The disclosures of the above applications are incorporated herein by reference in their entirety.

FIELD OF THE INVENTION

The invention relates to the field of network technology, and particularly to a method for establishing Tri-Element Peer Authentication-based Trusted Network Connect architecture.

BACKGROUND OF THE INVENTION

With the development of informatization, problems of malicious software such as viruses and worms are growing. Currently, more than 35,000 forms of malicious software have been found, and more than 40,000,000 computers are infected each year. To prevent these attacks, it is required not only secured transmission and inspection of data while they are being inputted, but also protection starting from the source, i.e., every endpoint connected to the network. However, conventional security protection techniques can no longer protect against the various malicious attacks.

To this end, the Trusted Computing Group (TCG) have introduced a network access specification based on Trusted Computing (TC) technology, i.e., Trusted Network Connect (TNC), referred to as TCG-TNC, which includes an open architecture for endpoint integrity and a set of standards that ensure secured interoperability. The set of standards can protect a network as needed by the user, to a user-defined level. Basically, the TCG-TNC is to establish a connection starting from endpoint integrity. Firstly, a set of policies for the operation of systems within a trusted network are established. Only the endpoints complying with the network-specified policy will be allowed to access the network, and those devices that do not comply with the policies will be isolated and located by the network. Due to the use of a Trusted Platform Module (TPM), attacks from rootkits can also be blocked. A rootkit is an attack script, a modified system program, or a set of attack scripts or tools, for illegally obtaining the highest privileges in a targeted system. The architecture of TCG-TNC is shown in FIG. 1.

Figure 1:
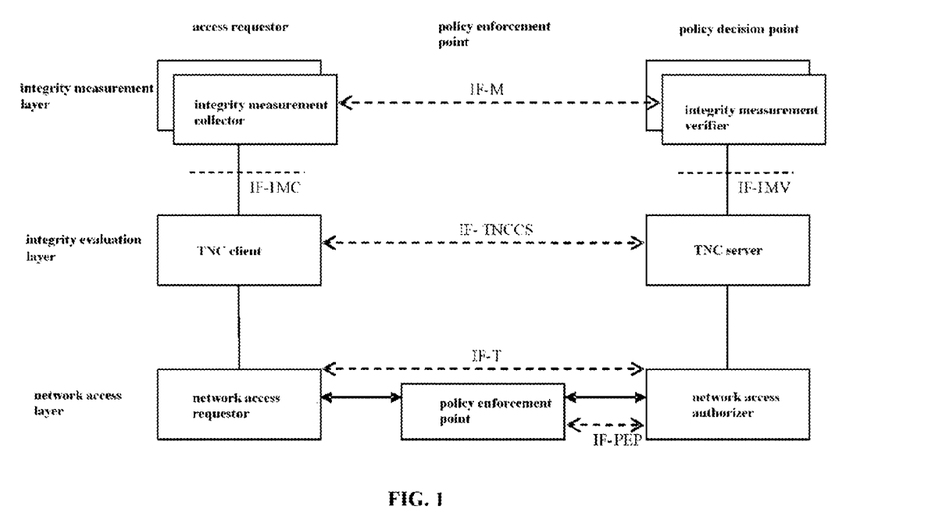
FIG. 1 is a schematic diagram of a TCG-TNC architecture in the prior art.

In FIG. 1, Vendor-Specific IMC-IMV Messages Interface (IF-M) is an interface between an Integrity Measurement Collector (IMC) and an Integrity Measurement Verifier (IMV); TNC Client-TNC Server Interface (IF-TNCCS) is an interface between a TNC client and a TNC server; Network Authorization Transport Protocol Interface (IF-T) is an interface between a network access requestor and a network access authorizer; Policy Enforcement Point Interface (IF-PEP) is an interface between a policy enforcement point and a network access authorizer; Integrity Measurement Collector Interface (IF-IMC) is an interface between an integrity measurement collector and a TNC client; and Integrity Measurement Verifier Interface (IF-IMV) is an interface between an integrity measurement verifier and a TNC server.

However, in the TCG-TNC architecture shown in FIG. 1, the access requestor does not evaluate the integrity of the policy enforcement point, hence the policy enforcement point can not be relied upon. To solve this problem, a TNC architecture based on Tri-element Peer Authentication (TePA) has been proposed. The TePA-based TNC architecture is shown in FIG. 2.

Figure 2:
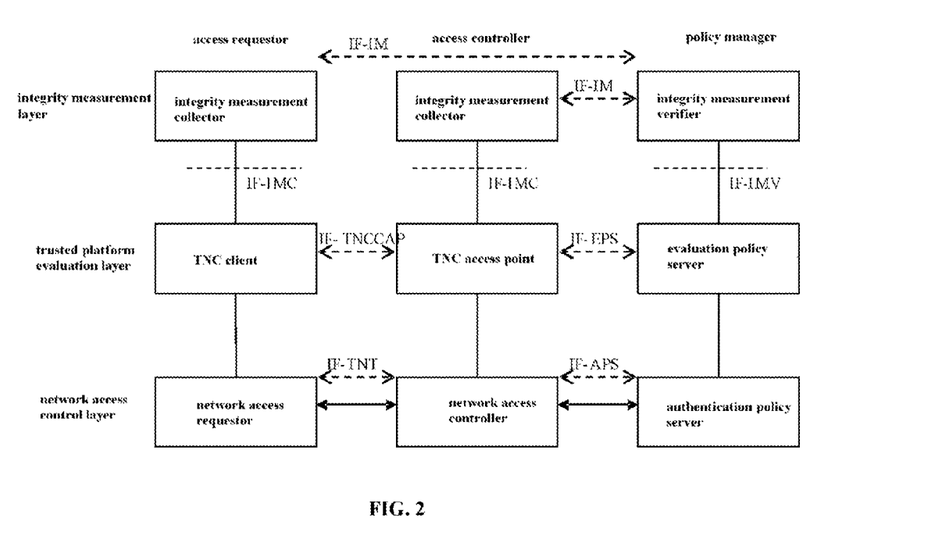
FIG. 2 is a schematic diagram of a TNC architecture based on TePA in the prior art.

In FIG. 2, Integrity Measurement Interface (IF-IM) is an interface between an integrity measurement collector and an integrity measurement verifier; TNC Client-TNC Access Point Interface (IF-TNCCAP) is an interface between a TNC client and a TNC access point; Evaluation Policy Service Interface (IF-EPS) is an interface between a TNC access point and an evaluation policy server; Trusted Network Transport Interface (IF-TNT) is an interface between a network access requestor and a network access controller; Authentication Policy Service Interface (IF-APS) is an interface between a network access controller and authentication policy server; Integrity Measurement Collector Interface (IF-IMC) is an interface between an integrity measurement collector and a TNC client, and between an integrity measurement collector and a TNC access point; and Integrity Measurement Verifier Interface (IF-IMV) is an interface between an integrity measurement verifier and an evaluation policy server.

To implement the TCG-TNC architecture shown in FIG. 1, the TCG has defined an implementing method for each of the interfaces in the TCG-TNC architecture, including: Remote Authentication Dial In User Service (RADIUS) defined in IF-PEP specification; tunneled Extensible Authentication Protocol (EAP) encapsulation and transport method defined in IF-T specification; message transport protocol and connection management for platform authentication (including platform credential authentication and integrity check handshake) defined in IF-TNCCS specification, which include how to route a message between an IMC and an IMV; encapsulation method for messages between an IMC and an IMV defined in IF-M specification, which includes defining an IF-M message describing attributes of the components and relating to processing attributes, such as product information attributes and security processing attributes; functions defined between a TNC client and an IMC in IF-IMC specification, to support platform authentication; and functions defined between a TNC client and an IMV, which is also to support platform authentication. Furthermore, during the process of TNC, some components in the TCG-TNC architecture may communicate with Trusted Platform Service (PTS) via a Trusted Platform Service Interface (IF-PTS). The PTS is responsible for managing an integrity measurement log, creating a snapshot and an integrity report, and providing services for some components in the TCG-TNC architecture via the IF-PTS. The IF-PTS is an interface that is not associated with the type of the architecture, i.e., the IF-PTS can be used in both the TNC architecture shown in FIG. 1 and the TNC architecture shown in FIG. 2.

Similarly, to implement the TePA-based TNC architecture shown in FIG. 2, an implementing method needs to be defined for each of the interfaces in the TePA-based TNC architecture. However, due to the significant differences between the TePA-based TNC architecture shown in FIG. 2 and the TCG-TNC architecture shown in FIG. 1, the implementing methods for the interfaces in the TePA-based TNC architecture shown in FIG. 2 should be different.

SUMMARY OF THE INVENTION

To solve the technical problems discussed in the BACKGROUND OF THE INVENTION, the present invention provides a method for establishing a tri-element peer authentication-based trusted network connect architecture, so as to establish trusted endpoints, realize trusted network connect of the endpoints, realize trusted authentication between the endpoints and realize trusted management of the endpoints. An object of the present invention is to establish a TePA-based TNC architecture by defining the interfaces.

A technical solution provided by the present invention includes a method for establishing a tri-element peer authentication-based trusted network connect architecture, the method including:

implementation of IF-TNT: user authentication between a network access requestor and an access controller is implemented by a user authentication protocol; data transport between the access requestor and the access controller during a process of TNC is implemented by a network transport protocol; and access control between the access requestor and the access controller is implemented by an access control protocol;

implementation of IF-APS: user authentication between a network access requestor and an access controller is implemented by a user authentication protocol; and data transport between the access requestor and the access controller during a process of TNC is implemented by a network transport protocol;

implementation of IF-TNCCAP: network connect management between a TNC client and a TNC access point is implemented by a network connect management mechanism; platform authentication between the access requestor and the access controller is implemented by a platform authentication protocol; platform authentication protocol management during a process of platform authentication is implemented by a platform authentication protocol management mechanism; and routing of an integrity measurement layer message is implemented by an encapsulation mechanism for an integrity measurement layer message;

implementation of IF-EPS: platform authentication between an access requestor and an access controller is implemented by a platform authentication protocol; routing of an integrity measurement layer message is implemented by an encapsulation mechanism for an integrity measurement layer message; and dynamic distribution of an evaluation policy for the access requestor is implemented by an evaluation policy dynamic distribution mechanism;

implementation of IF-IMC, including implementation of IF-IMC in an access requestor and implementation of IF-IMC in an access controller: integrity check handshake at the IF-IMC in the access requestor and integrity check handshake at the IF-IMC in the access controller are implemented by defining a function;

implementation of IF-IMV: integrity handshake at he IF-IMV is implemented by defining a function.

implementation of IF-IM: intercommunication between an IMC and an IMV is implemented by using an encapsulation method for a message transported between the IMC and the IMV.

The user authentication protocol in the implementation of IF-TNT and the implementation of IF-APS may be implemented in a way that, if user authentication between the access requestor and the access controller has been performed and security association between the access requestor and the access controller is still valid, then user authentication between the access requestor and the access controller is performed by using the security association between the access requestor and the access controller; otherwise, user authentication between the access request and the access controller is performed by the network access requestor, the network access controller and an authentication policy server executing a tri-element peer authentication protocol, with the authentication policy server being a trusted third party.

The network transport protocol in the implementation of IF-TNT and the implementation of IF-APS may be implemented in a way that, user authentication protocol data and platform authentication protocol data are encapsulated and transported in the same way as a EAP-tunneled encapsulation and transport mechanism, wherein the user authentication protocol data is encapsulated into an encapsulation transport packet, and the platform authentication protocol data is firstly encapsulated into an encapsulation transport packet and protected by a security tunnel, then the encapsulation transport packet that is protected by the security tunnel is further encapsulated into an encapsulation transport packet.

The network transport protocol in the implementation of IF-INT and the implementation of IF-APS may also be implemented in a way that, user authentication protocol data and platform authentication protocol data are encapsulated and transported by encapsulation transport mechanisms that are independent with each other, wherein the user authentication protocol data is independently encapsulated into an encapsulation transport packet, and the platform authentication protocol data is independently encapsulated into an encapsulation transport packet and protected by a security tunnel.

The access control protocol in the implementation of IF-TNT may be an access control method based on tri-element peer authentication.

The network connect management mechanism in the implementation of IF-TNCCAP may be implemented in a way that, the TNC client creates locally a network connect identifier for each TNC client-TNC access point pair, to identify each TNC process; the TNC access point creates locally a network connect identifier for each TNC client-TNC access point pair, to identify each TNC process; in a process of TNC, firstly a TNC client, a TNC access point and an evaluation policy server perform a process of platform authentication, and if platform remediation is needed after the process of platform authentication, or an evaluation policy is changed, then the TNC client, the TNC access point and the evaluation policy server perform another process of platform authentication, with the TNC client and the TNC access point maintaining the network connect identifiers created, until the process of TNC ends.

The platform authentication protocol in the implementation of IF-TNCCAP and the implementation of IF-EPS may be implemented as a tri-element peer authentication protocol executed by a TNC client, a TNC access point and an evaluation policy server, wherein the TNC client and the TNC access point request an integrity measurement value of each other's platform, the TNC client and the TNC access point verify only a platform signature of the integrity measurement value of each other's platform, and the evaluation policy server verifies validity of platform identity certificates and evaluates the integrity measurement values.

The platform authentication protocol management mechanism in the implementation of IF-TNCCAP may be implemented in a way that, in a process of platform authentication, a platform authentication protocol may be executed for a plurality of rounds by a TNC client, a TNC access point and an evaluation policy server, wherein, in each of the rounds of the platform authentication protocol, the TNC client and the TNC access point sends an integrity measurement parameter of each other's platform that is requested to be measured, and send an integrity measurement parameter that is obtained from measurement to the evaluation policy server; and when this round of platform authentication protocol is completed, if the integrity measurement parameter requested to be measured is different from the integrity measurement parameter obtained from measurement, then another round of platform authentication protocol is performed by the TNC client, the TNC access point and the evaluation policy server, otherwise, the process of platform authentication is successfully completed.

The encapsulation mechanism of an integrity measurement layer message in the implementation of IF-TNCCAP and the implementation of IF-EPS may include encapsulating in an encapsulation format including a message type, an integrity measurement collector identifier and an integrity measurement layer message.

The function defined in the IF-IMC in the access requestor in the implementation of IF-IMC may include: a TNC client finds and loads an IMC in the access requestor; the TNC client initializes the IMC in the access requestor; the IMC in the access requestor reports its supported message type to the TNC client; the TNC client notifies the IMC in the access requestor of a network connect status; the TNC client notifies the IMC in the access requestor of an integrity measurement parameter that is requested to be measured; the IMC in the access requestor sends an integrity measurement layer message to the TNC client; the IMC in the access requestor provides PCR reference data in an integrity measurement value to the TNC client, including referenced PCR values and a platform signature on these referenced PCR values; the TNC client notifies the IMC in the access requestor that the message of this round of platform authentication protocol is to be sent and asks the IMC in the access requestor to stop collecting the integrity measurement value; the TNC sends a received integrity measurement layer message to the IMC in the access requestor; the TNC client terminates the IMC in the access requestor; and the IMC in the access requests the TNC client to perform integrity check handshake again.

The function defined in the IF-IMC in the access controller in the implementation of the IF-IMC may include: a TNC access point finds and loads an IMC in the access controller; the TNC access point initializes the IMC in the access controller; the IMC in the access controller reports its supported message type to the TNC access point; the TNC access point notifies the IMC in the access controller of a network connect status; the TNC access point notifies an integrity measurement parameter that is required to be measured to the IMC in the access controller; the IMC in the access controller sends an integrity measurement layer message to the TNC access point; the IMC in the access controller provides PCR reference data in an integrity measurement value to the TNC access point, including referenced PCR values and a platform signature on these referenced PCR values; the TNC access point notifies the IMC in the access controller that the message of this round of platform authentication protocol is to be sent and asks the IMC in the access controller to stop collecting the integrity measurement value; the TNC access point sends a received integrity measurement layer message to the IMC in the access controller; the TNC access point terminates the IMC in the access controller; and the IMC in the access controller requests the TNC access point to perform integrity check handshake again.

The function defined in the IF-IMV in the implementation of IF-IMV may include: an evaluation policy server finds and loads an IMV in a policy manager; the evaluation policy server initializes the IMV in the policy manager; the IMV in the policy manger reports its supported message type to the evaluation policy server; the evaluation policy server notifies, the IMV in the policy manager, of an evaluation policy that needs to be set in the round of platform authentication protocol; the evaluation policy server sends a received integrity measurement layer message to the IMV in the policy manager; the IMV in the evaluation manager sends an integrity measurement layer message to the evaluation policy server; the IMV in the policy manger provides PCR reference data in an integrity measurement value to the evaluation policy server, including referenced PCR values and a platform signature on these referenced PCR values; the IMV in the policy manager provides a component-level evaluation result to the evaluation policy server; and the evaluation policy server terminates the IMV in the policy manager.

The encapsulation method for the IF-IM in the implementation of IF-IM may be the same as an encapsulation method for an IF-M in the TCG-TNC architecture.

In the implementation of the IF-EPS, dynamic distribution of an evaluation policy for an access requestor may be implemented by an evaluation policy dynamic distribution mechanism.

The evaluation policy dynamic distribution mechanism in the implementation of IF-EPS may include: a TNC access point requests an evaluation policy for an access requestor from an evaluation policy server, and the evaluation policy server returns the evaluation policy for the access requestor to the TNC access point.

The present invention has advantages below.

1. The present invention can establish trusted endpoints. During the process for establishing trusted endpoints, the integrity measurement collector, the TNC client and the TNC access point in the access requestor in the TePA-based TNC architecture are implemented by endpoints, and the integrity measurement verifier and the evaluation policy server in the policy manager may be implemented by endpoints, or by a third party service provider, then a platform authentication process in the TePA-based TNC architecture is performed to establish trusted endpoints.

2. The present invention can realize trusted network connect of endpoints. According to the present invention, in the process of trusted network connect of the endpoints, the access requestor in the TePA-based TNC architecture is implemented by endpoints that access the network, and the access controller and the policy manager are implemented by a network service provider, and some or all of the functions of the policy manager may also be implemented by third party service providers, then, a TNC process in the TePA-based TNC architecture is performed to realize trusted network connect of endpoints.

3. The present invention can realize trusted authentication between endpoints. According to the present invention, in the trusted authentication between endpoints, the access requestor in the TePA-based TNC architecture is implemented by a endpoint, and the access controller is implemented by another endpoint, the policy manager may be implemented by a network service provider, and some or all of the functions may also be implemented by a third party service provider, if user authentication between the endpoints has been performed and a session key has been generated, then the trusted authentication between the endpoints is implemented by executing a platform authentication process in the TePA-based TNC architecture, otherwise, the trusted authentication between the endpoints is implemented by executing a TNC process in the TePA-based TNC architecture.

4. The present invention can realize trusted management of endpoints. According to the present invention, in the process of trusted management for endpoints, the access requestor in the TePA-based TNC architecture is implemented by a endpoint, and the access controller and the policy manager are implemented by a network service provider, and some or all of the functions of the policy manger may also be implemented by a third party service provider, if user authentication between the endpoint and the network service provider has been performed and a session key has been generated, the trusted management of the endpoints is implemented by executing a platform authentication process in the TePA-based TNC architecture, otherwise, the trusted management of the endpoints is implemented by executing a TNC process in the TePA-based TNC architecture.

DETAILED DESCRIPTION OF THE INVENTION

The objects, technical solutions and advantages of the embodiments of the present invention will become more apparent by the following description of the technical solutions in the embodiments of the present invention in conjunction with the accompanying drawings in the embodiments of the present invention. As a matter of course, the embodiments disclosed herein are only some of the possible embodiments of the present invention, and any other embodiment obtained by those skilled in the art based on the embodiments disclosed herein without inventive efforts should fall within the scope of protection of the present invention.

An embodiment of the present invention provide a method for establishing a trusted network connect architecture based on tri-element peer authentication, including the steps of:

Step 1, the implementation of the IF-TNT and the IF-APS: the user authentication protocol defined in the IF-TNT and the IF-APS may be a tri-element peer authentication protocol based on a symmetric-key and asymmetric-key algorithm, e.g., the WAI protocol in the Chinese Wireless LAN Standards.

The network transport protocol defined in the IF-TNC and the IF-APS may include: the protocol data encapsulation packet may be the same as or similar to the protocol data encapsulation packet in the EAP, except that the processing of the protocol data encapsulation packet, specifically, the protocol data encapsulation packet is analyzed at the access controller, and then encapsulated into another protocol data encapsulation packet and sent to the other party, i.e., unlike the one in the EAP which is a point-to-point packet encapsulation and analyzing process, it is a three-party packet encapsulation and analyzing process, and the three-party protocol can be referred to as Tri-element Authentication Extensible Protocol (TAEP); the user authentication protocol data and the platform authentication protocol data may be encapsulated by an encapsulation method similar to a tunneled EAP, and may also be encapsulated in independent encapsulation methods; for the former, the access requestor and the access controller will receive a success type protocol data encapsulation packet such as a TAEP-success encapsulation packet, which corresponds to the whole TNC process; and for the latter, the access requestor and the access controller will receive two successful type protocol data encapsulation packet such as TAEP-success encapsulation packets, which correspond to the user authentication process and the platform authentication process respectively.

The access control protocol defined in the IF-TNT and the IF-APS may also use an access control method based on tri-element peer authentication, such as the access control method in the Chinese Wireless LAN standards.

Step 2, the implementation method of the IF-TNCCAP and the IF-EPS.

The network connect management mechanism defined in the IF-TNCCAP may be: the TNC client generates locally a network connect identifier between the TNC client and the TNC access point, and the TNC access point generates locally a network connect identifier between the TNC access point and the TNC client, the network connect identifier being denoted as ConnectionID; the TNC client and the TNC access point may set some network connect states for each ConnectionID, such as create, integrity check handshake, permit, forbid, isolate and connect terminate. In a TNC process, firstly the TNC client, the TNC access point and the evaluation policy server perform a process of platform authentication, and if platform remediation is needed after the process of platform authentication, or an evaluation policy is changed, then the TNC client, the TNC access point and the evaluation policy server perform another process of platform authentication, with the TNC client and the TNC access point maintaining the ConnectionIDs created where the network connect states may be set differently, until the process of TNC ends.

The platform authentication protocol management mechanism defined in the IF-TNCCAP may be: in a process of platform authentication, the platform authentication protocol may be executed for a plurality of rounds by the TNC client, the TNC access point and the evaluation policy server, in each of the rounds of the platform authentication protocol, the TNC client and the TNC access point sends an integrity measurement parameter of each other's platform that is requested to be measured, and send an integrity measurement parameter that is obtained from measurement to the evaluation policy server; and when this round of platform authentication protocol is completed, if the integrity measurement parameter requested to be measured is different from the integrity measurement parameter obtained from measurement, then another round of platform authentication protocol is performed by the TNC client, the TNC access point and the evaluation policy server, otherwise, the process of platform authentication is successfully completed.

The evaluation policy dynamic distribution mechanism defined in the IF-EPS may be: the evaluation policy server sets a corresponding evaluation policy for users of each level and services of each level; the TNC access point may send, a user identity of the access requestor, or a service requested by the access requestor, or the user identity of the access requestor and the service requested by the access requestor, to the evaluation policy server, then, the evaluation policy server returns the evaluation policy for the access requestor to the TNC access point, according to a local setting.

The encapsulation mechanism for an integrity measurement layer message defined in the IF-TNCCAP and the IF-EPS may be a (message type+integrity measurement collector identifier+integrity measurement layer message table) list, and the message type may include a component type and a manufacturer identifier.

| Message type | Integrity measurement collector identifier | Integrity measurement layer message 1 | Integrity measurement layer message 2 | ... |
|---|---|---|---|---|
| Message type | Integrity measurement collector identifier | Integrity measurement layer message 1 | Integrity measurement layer message 2 | ... |
| ... | ... | ... | ... | ... |

The platform authentication protocol defined in the IF-TNCCAP and the IF-APS is a tri-element peer authentication protocol performed by the TNC client, the TNC access point and the evaluation policy server, specifically, the TNC client and the TNC access point request an integrity measurement value of each other's platform, the TNC client and the TNC access point verify only a platform signature of the integrity measurement value of each other's platform, and the evaluation policy server verifies validity of platform identity certificates and evaluates the integrity measurement values.

Step 3, the implementation method for the IF-IMC in the access requestor.

The function of the IF-IMC in the access requestor may include:

(1) a function for finding and loading the IMC in the access requestor, which is platform specific and may be implemented by different methods;

(2) initialization function TNC_IMC_Initialize {imcID, minVersion, maxVersion, *pOutActualVersion}, for initializing the IMC, and is implemented by the IMC in the access requestor, where imcID is an integrity measurement collector identifier assigned to the IMC by the TNC client, minVersion and maxVersion are the version numbers of an application interface function that are supported by the TNC client, *pOutActualVersion is the version number of the application interface function that is actually used;

(3) message type notification function TNC_TNCC_ReportMessageTypes {imcID, supportedTypes, typeCount}, by which the IMC in the access requestor notifies the TNC client of the supported message type, and which is implemented by the TNC client, where, supportedTypes is a message type that is supported by the access requestor, and typeCount is the number of message types that are supported by the access requestor;

(4) connect state notification function TNC_IMC_NotifyConnectionChange {imc ID, connectionID, newState}, by which the TNC client notifies the IMC in the access requestor of the network connect sate, and which is implemented by the IMC, where, connectionID is a network connect identifier created by the TNC client, newState is a network connect sate, and specifically may include CREATE, HANDSTAKE, DELET, ACCESS_ALLOWED, ACCESS_ISOLATED or ACCESS_NONE;

(5) measurement parameter notification function TNC_IMC_RequestMeasurementInfo {imcID, connectionID, MeasurementInfo}, by which the TNC client notifies the IMC in the access requestor of the integrity measurement parameter that is requested to be measured, and which is implemented by the IMC, where, MeasurementInfo is an integrity measurement parameter that is requested to be measured;

(6) measurement layer message sending function TNC_TNCC_SendMes sage {imcID, connectionID, message, messageLength, messageType}, by which the IMC in the access requestor sends an integrity measurement layer message to the TNC client, and which is implemented by the TNC client, where, message is an integrity measurement layer message, messageLength is the length of the message, messageType is the type of the message;

(7) PCR reference data providing function TNC_TNCC_ProvidePCRsIndex {imcID, connectionID, PCRsIndex}, by which the IMC in the access requestor provides the PCR reference data (known by the trusted platform evaluation layer component) in the integrity measurement value to the TNC client, and which is implemented by the TNC client, where PCRsIndex is PCR reference data in the integrity measurement value;

(8) ending collection notification function TNC_IMC_PAIEnding {imcID, connectionID}, by which the TNC client notifies the IMC in the access requestor that the message at the step of the round of the evaluation authentication protocol is to be sent and asks the IMC in the access requestor to stop collecting the integrity measurement value, and which is implemented by the IMC;

(9) received measurement layer message sending function TNC_IMC_ReceiveMes sage {imcID, connectionID, message, messageLength, messageType}, by which the TNC client sends a received integrity measurement layer message to the IMC in the access requestor, and which is implemented by the IMC;

(10) access terminating function TNC_IMC_Terminate {imcID}, by which the TNC client terminates the IMC in the access requestor, and which is implemented by the IMC;

(11) handshake requesting function TNC_TNCC_RequestHandshakeRetry {imcID, connectionID, reason}, by which the IMC in the access requestor requests the TNC client to perform integrity check handshake again, and which is implemented by the TNC client, where reason is the reason for requesting to perform integrity check handshake again.

Figure 3:
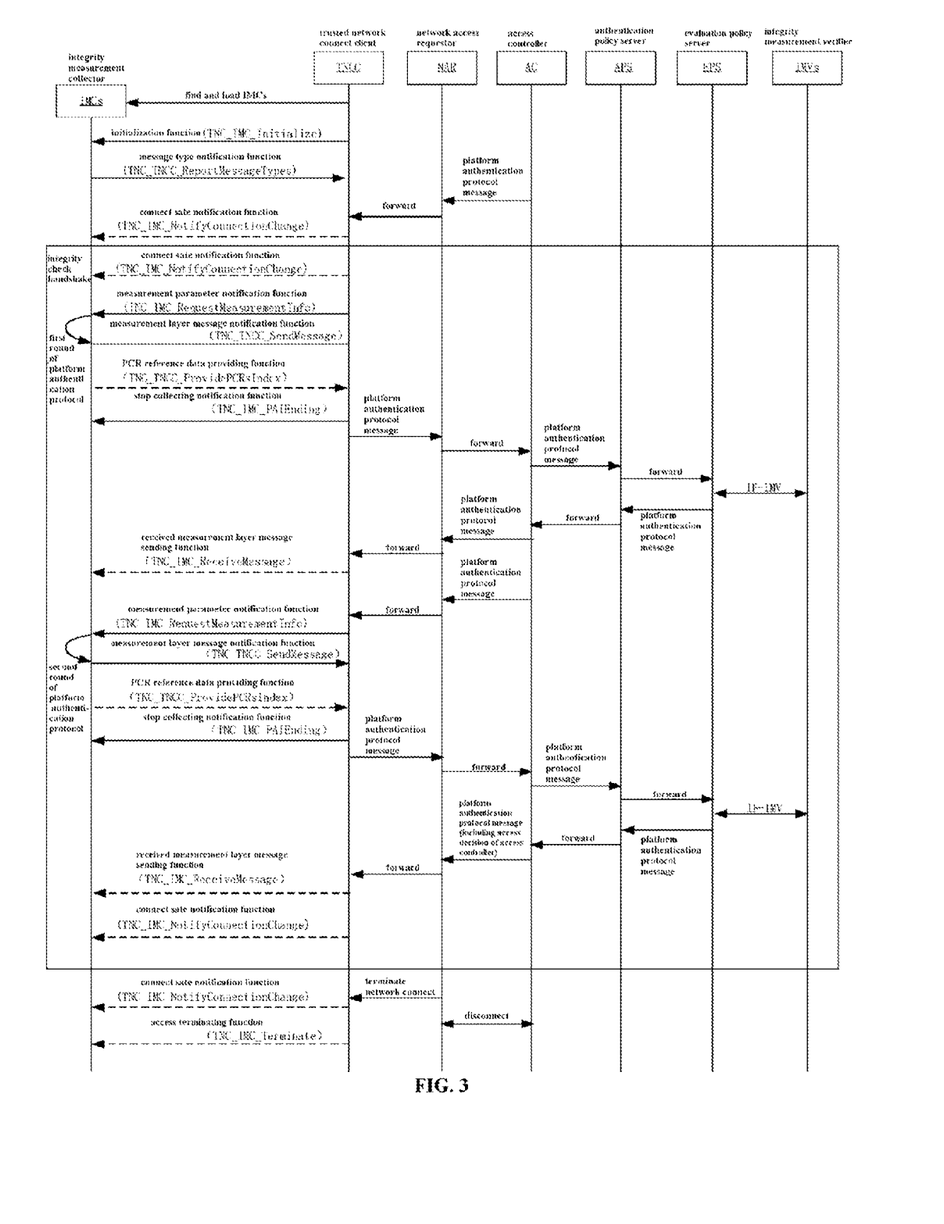
FIG. 3 illustrates interactions at the IF-IMC in an access requestor according to the present invention.

The interactions at the IF-IMC in the access requestor in the platform authentication process are shown in FIG. 3. In FIG. 3, the functions in the IF-IMC represented by the arrows with dotted lines are optional, and the functions represented by the arrows with solid lines are mandatory, the platform authentication protocol may be performed by any number of rounds (i.e., not limited to 2 rounds) in the process of the integrity check handshake, until the access decision is made, and both the access requestor and the access controller may initiate the platform authentication protocol.

Step 4, the implementation method of the IF-IMC in the access controller.

The function of the IF-IMC in the access controller may be:

(1) a function, for finding and loading the IMC in the access controller, which is platform specific and may be implemented by different methods;

(2) initialization function TNC_IMC_Initialize {imcID, minVersion, maxVersion, *pOutActualVersion} for initializing the IMC, which is implemented by the IMC in the access controller, where imcID is an integrity measurement collector identifier assigned to the IMC by the TNC access point, minVersion and maxVersion are the version numbers of an application interface function supported by the TNC access point, *pOutActualVersion is the version number of the application interface function that is actually used;

(3) message type notification function TNC_TNCAP_ReportMessageTypes{imcID, supportedTypes, typeCount}, by which the IMC in the access controller notifies the TNC access point of the supported message type, and which is implemented by the TNC access point, where supportedTypes is the type of the messages that is supported by the access controller, and typeCount is the number of message types that is supported by the access controller;

(4) connect state notification function TNC_IMC_NotifyConnectionChange {imcID, connectionID, newState}, by which the TNC access point notifies the IMC in the access controller of the network connect sate, and which is implemented by the IMC, where connectionID is a network connect identifier created by the TNC access point, newState is a network connect state and specifically may include CREATE, HANDSTAKE, DELET, ACCESS_ALLOWED, ACCESS_ISOLATED or ACCESS_NONE;

(5) measurement parameter notification function TNC_IMC_RequestMeasurementInfo {imcID, connectionID, MeasurementInfo}, by which the TNC access point notifies the IMC in the access controller of the integrity measurement parameter that is requested to be measured, and which is implemented by the IMC, where MeasurementInfo is an integrity measurement parameter that is requested to be measured;

(6) measurement layer message sending function TNC_TNCAP_SendMessage {imcID, connectionID, message, messageLength, messageType}, by the IMC in the access controller sends an integrity measurement layer message to the TNC access point, and which is implemented by the TNC access point, where message is an integrity measurement layer message, messageLength is the length of the message, messageType is the type of the message;

(7) PCR reference data providing function TNC_TNCAP_ProvidePCRsIndex {imcID, connectionID, PCRsIndex}, by which the IMC in the access controller provides the PCR reference data (known by the trusted platform evaluation layer component) in the integrity measurement value to the TNC access point, and which is implemented by the TNC access point, where PCRsIndex is PCR reference data in the integrity measurement value;

(8) ending collection notifying function TNC_IMC_PAIEnding {imcID, connectionID}, by which the TNC access point notifies the IMC in the access controller that the message of the round of the evaluation authentication protocol is to be sent and asks the IMC in the access controller to stop collecting the integrity measurement value, and which is implemented by the IMC;

(9) received measurement layer message sending function TNC_IMC_ReceiveMes sage {imcID, connectionID, message, messageLength, messageType}, by which the TNC access point sends a received integrity measurement layer message to the IMC in the access controller, and which implemented by the IMC;

(10) terminating access function TNC_IMC_Terminate {imcID}, which is used by the TNC access point to terminate the IMC in the access controller, and which is implemented by the IMC;

(11) handshake requesting function TNC_TNCC_RequestHandshakeRetry {imcID, connectionID, reason}, by which the IMC in the access controller requests the TNC access point to perform integrity check handshake again, and which is implemented by the TNC access point, where reason is the reason for requesting to perform integrity check handshake again.

Figure 4:
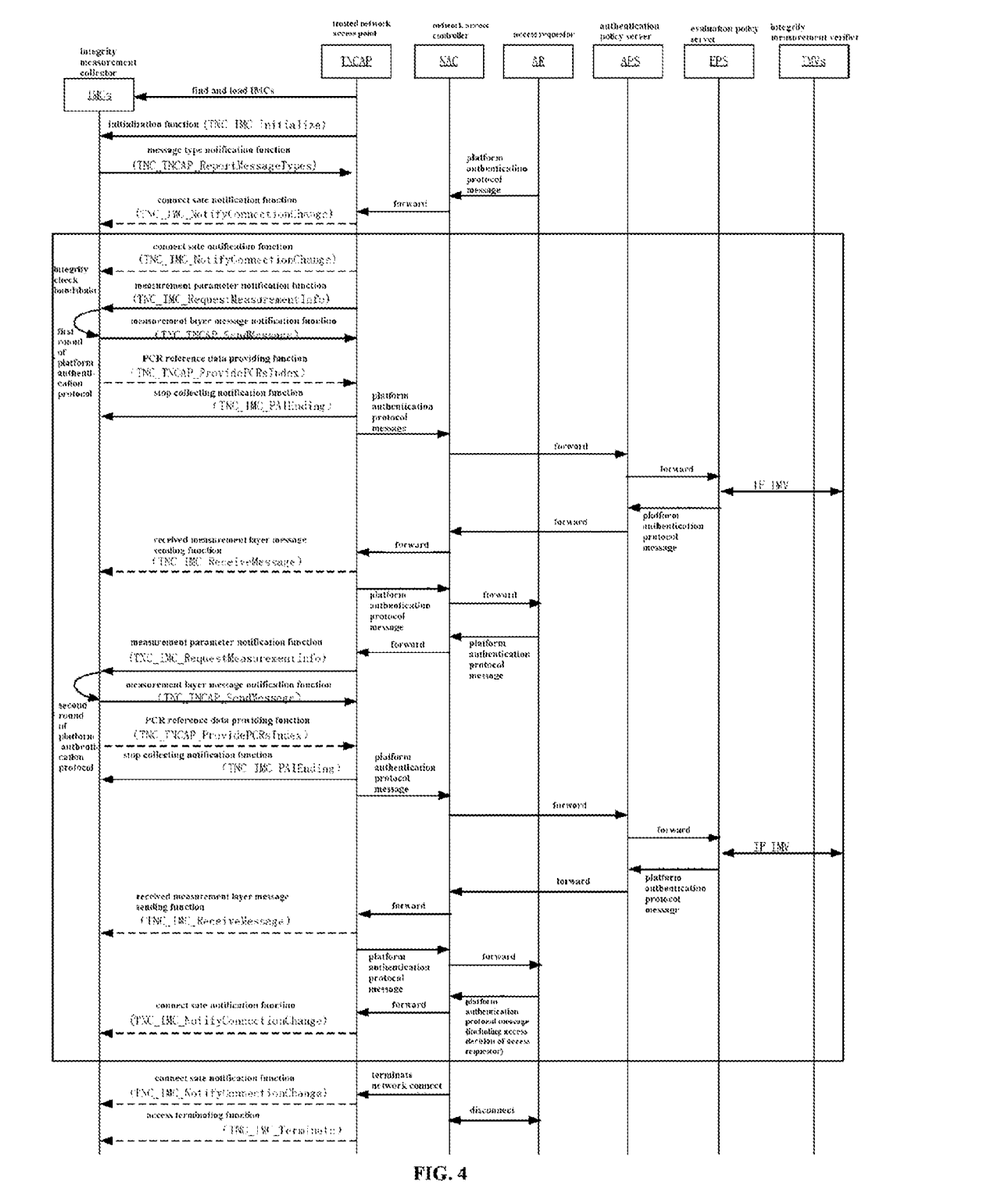
FIG. 4 illustrates interactions at the IF-IMC in an access controller according to the present invention.

The interactions at the IF-IMC in the access controller in the platform authentication process are shown in FIG. 4. In FIG. 4, the functions in the IF-IMC represented by the arrows with dotted lines are optional, and the functions represented by the arrows with solid lines are mandatory, the platform authentication protocol may be performed by any number of rounds (i.e., not limited to 2 rounds) in the process of the integrity check handshake, until the access decision is made, and both the access requestor and the access controller may initiate the platform authentication protocol.

Step 5, the implementation method of the IF-IMV: the function in the policy manager is:

(1) a function for finding and loading the IMV in the policy manager, which is platform specific and may be implemented by different methods;

(2) initialization function TNC_IMV_Initialize {imvID, minVersion, maxVersion, *pOutActualVersion}, by which the evaluation policy server initializes the IMV in the policy manager, and which is implemented by the IMV in the policy manager, where imvID is an integrity measurement verifier identifier that is assigned to the IMV in the policy manager by the evaluation policy server, minVersion and maxVersion are the version numbers of an application interface function supported by the evaluation policy server, *pOutActualVersion is the version number of the application interface function that is actually used;

(3) message type notification function TNC_EPS_ReportMessageTypes {imcID, supportedTypes, typeCount}, by which the IMV in the policy manager notifies the evaluation policy server of the supported message type, and which is implemented by the evaluation policy server, where supportedTypes is the type of the messages that is supported by the IMV in the policy manager, and typeCount is the number of the message type that is supported by the IMV in the policy manager;

(4) evaluation policy notification function TNC_IMV_SetAtrributePolicy {imvID, PAIBindingID, AttributePolicy}, by which the evaluation policy server notifies the IMV in the policy manager of the evaluation policy that needs to be set in the round of the platform authentication protocol, and which is implemented by the IMV in the policy manager, where PAIBindingID is a platform authentication protocol binding identifier that is created for the round of the platform authentication protocol by the evaluation policy server, for the purpose of enabling the evaluation server to manage the evaluation authentication protocols performed by the evaluation server, for example, a random number derived from a platform authentication verifying challenge NAC-PM of the access controller and a platform authentication requesting challenge NAR of the access requestor in the platform authentication protocol, and AttributePolic is an evaluation policy required to be set;

(5) received measurement layer message sending function TNC_IMV_ReceiveMes sage {imvID, PAIBindingID, message, messageLength, messageType}, by which the evaluation policy server sends a received integrity measurement layer message to the IMV in the policy manager, and which is implemented by the IMV in the policy manager, where message is an integrity measurement layer message, messageLength is the length of the message, and messageType is the type of the message;

(6) measurement layer message sending function TNC_EPS_SendMessage {imvID, PAIBindingID, message, messageLength, messageType}, by which the IMV in the policy manager sends an integrity measurement layer message to the evaluation policy server, and which is implemented by the evaluation policy server;

(7) evaluation result providing function TNC_EPS_ProvideRecommendation {imvID, PAIBindingID, recommendation, evaluation}, by which the IMV in the policy manager provides component-level evaluation results (known by the trusted platform evaluation layer component) to the evaluation policy server, and which is implemented by the evaluation policy server, where recommendation is an action recommendation in the component-level evaluation result, and evaluation is the evaluation result in the component-level evaluation result;

(8) PCR reference data providing function TNC_EPS_ProvidePCRsIndex {imvID, PAIBindingID, PCRsIndex}, by which the IMV in the policy manager provides PCR reference data in the integrity measurement value (known by the trusted evaluation layer component) to the evaluation policy server, and which is implemented by the evaluation policy server, where PCRsIndex is PCR reference data in the integrity measurement value;

(9) access terminating function TNC_IMV_Terminate {imcID}, by which the evaluation policy server terminates the IMV in the policy manager, and which is implemented by the policy manager.

Figure 5:
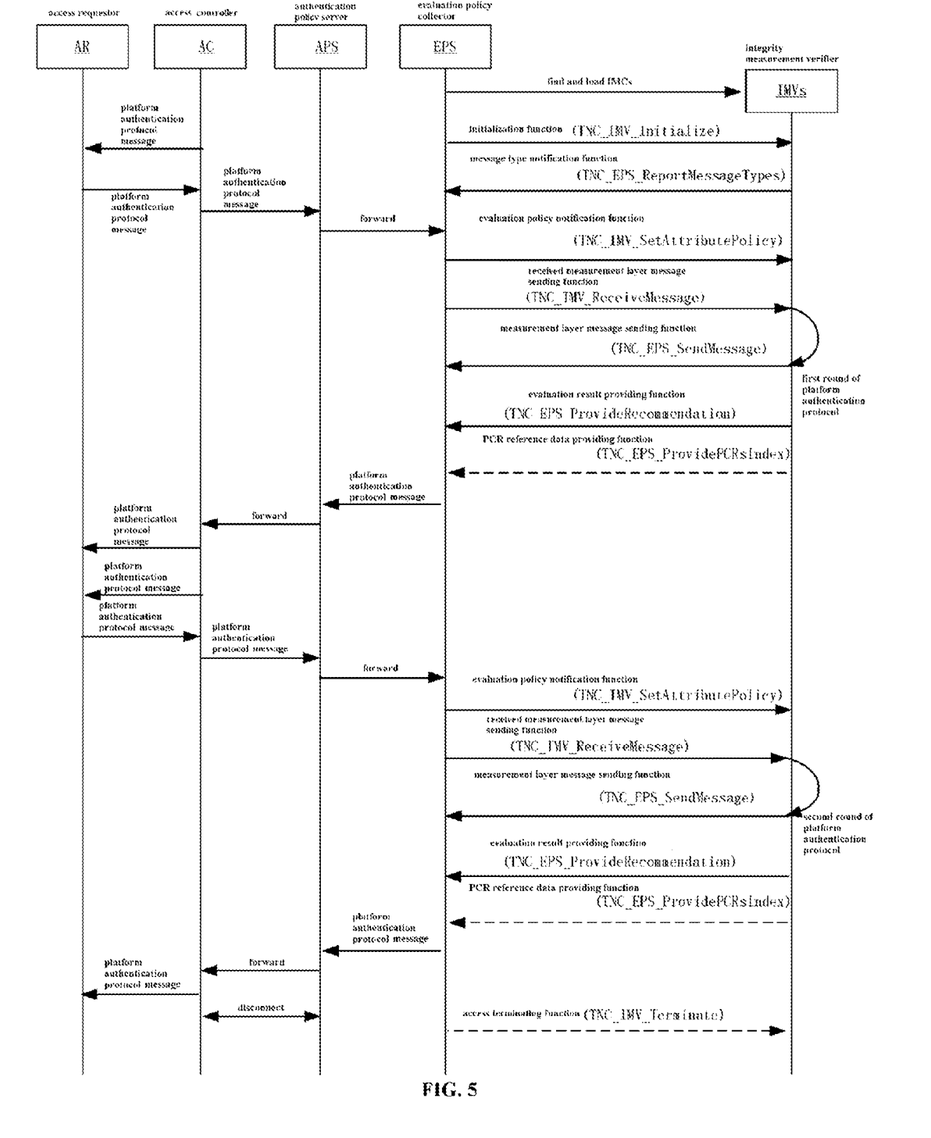
FIG. 5 illustrates interactions at the IF-IMV in a policy manager according to the present invention.

The interactions at the IF-IMV in policy manager in the platform authentication process are shown in FIG. 5. In FIG. 5, the functions in the IF-IMV represented by the arrows with dotted lines are optional, and the functions represented by the arrows with solid lines are mandatory, the platform authentication protocol may be performed by any number of rounds (i.e., not limited to 2 rounds) in the process of the integrity check handshake, until the access decision is made, and both the access requestor and the access controller may initiate the platform authentication protocol.

Step 6, the implementation method of the IF-IM:

The implementation method of the IF-IM is the same as that of the IF-M in the TCG-TNC architecture, except that TNC_IMC_RequestMeasurementInfo is used for the function of requesting integrity measurement attributes in the TCG-TNC architecture (using an integrity measurement layer message, i.e., using an IF-M message).

It is noted that, the embodiments above are for illustrative purposes only, and should not be interpreted as limiting the technical solutions of the present invention. The present invention is described in conjunction with the embodiments above, however, it is apparent to those skilled in the art that, modifications and equivalents can be made to the technical solutions disclosed in the embodiments, without deviation from the scope of the present invention.

The invention claimed is:

1. A method for a tri-element peer authentication (TePA)-based trusted network connect (TNC) architecture, comprising:

configuring an access control mechanism, a network transmission mechanism, and a user authentication protocol using a Trusted Network Transport Interface (IF-TNT) and an Authentication Policy Service Interface (IF-APS); wherein the access control mechanism utilizes a tri-element peer authentication (TePA) protocol between an access requestor (AR), an access controller (AC), and a policy manager (PM); wherein the network transmission mechanism utilizes a Trusted Network Connect (TNC) process that comprises encapsulation of TePA protocols between the AR and the AC and between the AC and the PM; and wherein the user authentication protocol is a TePA protocol executed by the AR, the AC, and the PM so as to achieve user authentication between the AR and the AC, where the PM functions as a trusted third party in the TePA-based authentication protocol;

configuring a network connection management mechanism, a platform authentication protocol management mechanism, and a platform authentication protocol using a TNC Client-TNC Access Point Interface (IF-TNCCAP) and an Evaluation Policy Service Interface (IF-EPS); wherein the network connection management mechanism includes participation of a TNC client and a TNC access point in network connection management and does not include participation of an evaluation policy server (EPS) in network connection management; wherein the platform authentication protocol management mechanism includes participation of a TNC client and a TNC access point in platform authentication management; wherein platform authentication between the access requestor and the access controller is achieved by a platform authentication protocol; and wherein the platform authentication protocol is a TePA protocol executed by a TNC client, a TNC access point, and the evaluation policy server so as to achieve platform authentication between the AR and the AC, where the PM functions as a trusted third party;

performing an integrity check handshake at an Integrity Measurement Collector Interface (IF-IMC) in the access requestor and an integrity check handshake at the IF-IMC in the access controller according to a first function using the IF-IMC;

performing an integrity handshake at an Integrity Measurement Verifier Interface (IF-IMV) in the policy manager according to a second function using the IF-IMV; and using an Integrity Measurement Interface (IF-IMC) for intercommunication between an Integrity Measurement Collector (IMC) and an Integrity Measurement Verifier (IMV) to transport a message, wherein an encapsulation method is used for the message transported between the AR, the AC and the PM.

2. The method of claim 1, wherein the user authentication protocol is configured using the IF-TNT and the IF-APS so that, if user authentication between the access requestor and the access controller has been performed and a security association between the access requestor and the access controller is still valid, then user authentication between the access requestor and the access controller is performed by using the security association between the access requestor and the access controller; otherwise, user authentication between the access requestor and the access controller is performed by the access requestor, the access controller and an authentication policy server executing the tri-element peer authentication protocol, with the authentication policy server being a trusted third party.

3. The method of claim 1, further comprising configuring a network transport protocol using the IF-TNT and the IF-APS, wherein the network transport protocol is configured to encapsulate and transport user authentication protocol data and platform authentication protocol data in the same way as an Extensible Authentication Protocol (EAP)-tunneled encapsulation and transport mechanism, wherein the user authentication protocol data is encapsulated into an encapsulation transport packet, and the platform authentication protocol data is firstly encapsulated into a first encapsulation transport packet and protected by a security tunnel, and then the first encapsulation transport packet that is protected by the security tunnel is further encapsulated into a second encapsulation transport packet.

4. The method of claim 1, further comprising configuring a network transport protocol using the IF-INT and the IF-APS, wherein the network transport protocol is configured to encapsulate and transport user authentication protocol data and platform authentication protocol data by encapsulation transport mechanisms that are independent of each other, wherein the user authentication protocol data is independently encapsulated into a first encapsulation transport packet, and the platform authentication protocol data is independently encapsulated into a second encapsulation transport packet and protected by a security tunnel.

5. The method of claim 1, further comprising configuring an access control protocol using the IF-TNT, wherein the access control protocol is an access control method based on tri-element peer authentication.

6. The method of claim 1, wherein the IF-TNCCAP network connection management mechanism between the TNC client and the TNC access point comprises the TNC client creating a local network connect identifier for each TNC client-TNC access point pair, to identify each TNC process; the TNC access point creating a local network connect identifier for each TNC client-TNC access point pair, to identify each TNC process; in a process of TNC, firstly a TNC client, a TNC access point and an evaluation policy server perform a first process of platform authentication, and if platform remediation is needed after performing the process of platform authentication, or if an evaluation policy is changed, then the TNC client, the TNC access point and the evaluation policy server perform a second process of platform authentication, with the TNC client and the TNC access point maintaining the network connect identifiers created, until the process of TNC ends.

7. The method of claim 1, wherein the IF-TNCCAP/IF-EPS platform authentication protocol is a tri-element peer authentication protocol executed by a TNC client, a TNC access point and an evaluation policy server, wherein the TNC client and the TNC access point request an integrity measurement value of each other's platform, the TNC client and the TNC access point verify only a platform signature of the integrity measurement value of each other's platform, and the evaluation policy server verifies validity of platform identity certificates and evaluates the integrity measurement values.

8. The method of claim 1, wherein the IF-TNCCAP platform authentication protocol management mechanism uses a process of platform authentication, wherein the platform authentication protocol is executed for a plurality of rounds by a TNC client, a TNC access point and an evaluation policy server, wherein, in each of the rounds of the platform authentication protocol, the TNC client and the TNC access point send an integrity measurement parameter of each other's platform that is requested to be measured, and send an integrity measurement parameter that is obtained from measurement to the evaluation policy server; and when a first round of platform authentication protocol is completed, if the integrity measurement parameter requested to be measured is different from the integrity measurement parameter obtained from measurement, then a second round of platform authentication protocol is performed by the TNC client, the TNC access point and the evaluation policy server, otherwise, the process of platform authentication is successfully completed.

9. The method of claim 1, further comprising routing an integrity measurement layer message using an encapsulation mechanism for the integrity measurement layer message, wherein the encapsulation mechanism of the integrity measurement layer message is configured using the IF-TNCCAP and the IF-EPS, and wherein the encapsulation mechanism comprises encapsulating in an encapsulation format comprising a message type, an integrity measurement collector identifier and the integrity measurement layer message.

10. The method of claim 1, wherein the first function comprises: a TNC client finding and loading an IMC in the access requestor; the TNC client initializing the IMC in the access requestor; the IMC in the access requestor reporting its supported message type to the TNC client; the TNC client notifying the IMC in the access requestor of a network connect status; the TNC client notifying the IMC in the access requestor of an integrity measurement parameter that is requested to be measured; the IMC in the access requestor sending an integrity measurement layer message to the TNC client; the IMC in the access requestor providing Platform Configuration Register (PCR) reference data in an integrity measurement value to the TNC client, comprising referenced PCR values and a platform signature on the referenced PCR values; the TNC client notifying the IMC in the access requestor that the message of a current round of platform authentication protocol is to be sent and asking the IMC in the access requestor to stop collecting the integrity measurement value; the TNC client sending a received integrity measurement layer message to the IMC in the access requestor; the TNC client terminating the IMC in the access requestor; and the IMC in the access requestor requesting the TNC client to perform the integrity check handshake again.

11. The method of claim 1, wherein the first function comprises: a TNC access point finding and loading an IMC in the access controller; the TNC access point initializing the IMC in the access controller; the IMC in the access controller reporting its supported message type to the TNC access point; the TNC access point notifying the IMC in the access controller of a network connect status; the TNC access point notifying an integrity measurement parameter that is required to be measured to the IMC in the access controller; the IMC in the access controller sending an integrity measurement layer message to the TNC access point; the IMC in the access controller providing PCR reference data in an integrity measurement value to the TNC access point, comprising referenced PCR values and a platform signature on the referenced PCR values; the TNC access point notifying the IMC in the access controller that the message of a current round of platform authentication protocol is to be sent and asking the IMC in the access controller to stop collecting the integrity measurement value; the TNC access point sending a received integrity measurement layer message to the IMC in the access controller; the TNC access point terminating the IMC in the access controller; and the IMC in the access controller requesting the TNC access point to perform the integrity check handshake again.

12. The method of claim 1, wherein the second function comprises: an evaluation policy server finding and loading an IMV in a policy manager; the evaluation policy server initializing the IMV in the policy manager; the IMV in the policy manager reporting its supported message type to the evaluation policy server; the evaluation policy server notifying the IMV in the policy manager of an evaluation policy that needs to be set in the round of platform authentication protocol; the evaluation policy server sending a received integrity measurement layer message to the IMV in the policy manager; the IMV in the policy manager sending an integrity measurement layer message to the evaluation policy server; the IMV in the policy manager providing PCR reference data in an integrity measurement value to the evaluation policy server, comprising referenced PCR values and a platform signature on the referenced PCR values; the IMV in the policy manager providing a component-level evaluation result to the evaluation policy server; and the evaluation policy server terminating the IMV in the policy manager.

13. The method of claim 1, wherein the encapsulation method for the IF-IM is the same as an encapsulation method for an IF-M in a TCG-TNC architecture.

14. The method of claim 1, further comprising dynamically distributing an evaluation policy for an access requestor using an evaluation policy dynamic distribution mechanism.

15. The method of claim 14, wherein the evaluation policy dynamic distribution mechanism comprises: a TNC access point requesting an evaluation policy for an access requestor from an evaluation policy server, and the evaluation policy server returning the evaluation policy for the access requestor to the TNC access point.

* * * * *